(12) United States Patent
Hirano (10) Patent No.: US 12,355,199 B2
(45) Date of Patent: Jul. 8, 2025

(54) TERMINAL COVER

(71) Applicant: SUMITOMO WIRING SYSTEMS, LTD., Mie (JP)

(72) Inventor: Shinji Hirano, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 485 days.

(21) Appl. No.: 17/914,159

(22) PCT Filed: Mar. 8, 2021

(86) PCT No.: PCT/JP2021/008955
§ 371 (c)(1),
(2) Date: Feb. 13, 2023

(87) PCT Pub. No.: WO2021/192958
PCT Pub. Date: Sep. 30, 2021

(65) Prior Publication Data
US 2023/0187853 A1 Jun. 15, 2023

(30) Foreign Application Priority Data
Mar. 27, 2020 (JP) .................... 2020-057971

(51) Int. Cl.
*H01R 4/70* (2006.01)
(52) U.S. Cl.
CPC ...................... *H01R 4/70* (2013.01)
(58) Field of Classification Search
CPC ........................................ H01R 4/70
USPC .................................. 439/135, 552
See application file for complete search history.

(56) References Cited

U.S. PATENT DOCUMENTS

| | | | | |
|---|---|---|---|---|
| 4,698,459 A | * | 10/1987 | Drake | H01R 11/284 439/522 |
| 4,778,408 A | * | 10/1988 | Morrison | H01R 11/28 439/522 |
| 5,346,407 A | * | 9/1994 | Hood | B60R 16/04 439/522 |
| 5,576,516 A | * | 11/1996 | Kameyama | H01M 50/562 439/522 |

(Continued)

FOREIGN PATENT DOCUMENTS

| | | |
|---|---|---|
| JP | H08-096863 A | 4/1996 |
| JP | 2007-200661 A | 8/2007 |

(Continued)

*Primary Examiner* — Harshad C Patel
(74) *Attorney, Agent, or Firm* — Venjuris, P.C.

(57) ABSTRACT

A terminal cover includes a terminal protector having an opening part that is open upward, a wire protection part provided rearward continuously with the terminal protector, and a lid joined to a front end of the wire protection part via a hinge and configured to open and close the opening part from above. A latching wall including a latching boss is provided to extend upward on an upper surface of the wire protection part. In a closed state in which the opening part is blocked off, the lid includes a protruding part protruding upward of the upper surface of the wire protection part, and a surrounding part provided continuously downward from the protruding part and widening outward from the protruding part. Also, the protruding part is provided with a latching part.

5 Claims, 9 Drawing Sheets

(56) References Cited

U.S. PATENT DOCUMENTS

| | | | | |
|---|---|---|---|---|
| 5,902,695 | A * | 5/1999 | Siedlik | H01R 11/284 |
| | | | | 439/522 |
| 5,910,029 | A * | 6/1999 | Siedlik | H01R 11/284 |
| | | | | 439/522 |
| 6,225,000 | B1 * | 5/2001 | Pavlik | H01R 11/284 |
| | | | | 429/175 |
| 6,376,771 | B1 * | 4/2002 | Kosuge | H01R 4/70 |
| | | | | 439/522 |
| 6,426,465 | B1 * | 7/2002 | Kosuge | H01R 13/5213 |
| | | | | 439/522 |
| 6,512,177 | B2 * | 1/2003 | Kosuge | H01R 11/284 |
| | | | | 174/67 |
| 6,576,838 | B2 * | 6/2003 | Matsumura | H01H 85/044 |
| | | | | 439/522 |
| 7,361,841 | B1 * | 4/2008 | Smolen | H01R 4/70 |
| | | | | 174/188 |
| 9,035,179 | B2 * | 5/2015 | Matsumoto | H01H 85/175 |
| | | | | 174/67 |
| 9,893,340 | B2 * | 2/2018 | Nakayama | H01M 50/55 |
| 10,347,878 | B2 * | 7/2019 | Tsukiyoshi | H01M 50/147 |
| 10,770,810 | B2 * | 9/2020 | Tsuchiya | H01R 11/284 |
| 10,978,825 | B2 * | 4/2021 | Brescianini | H02K 5/225 |
| 11,170,916 | B2 * | 11/2021 | Ringström | H01B 17/58 |
| 2002/0168566 | A1 * | 11/2002 | Ohtsuka | H01M 50/588 |
| | | | | 429/175 |
| 2016/0006003 | A1 * | 1/2016 | Ohashi | H01M 50/591 |
| | | | | 429/175 |

FOREIGN PATENT DOCUMENTS

| | | |
|---|---|---|
| JP | 2012-191711 A | 10/2012 |
| JP | 2013-033604 A | 2/2013 |

* cited by examiner

TERMINAL COVER

CROSS REFERENCE TO RELATED APPLICATIONS

This application is a national phase of PCT application No. PCT/JP2021/008955, filed on 8 Mar. 2021, which claims priority from Japanese patent application No. 2020-057971, filed on 27 Mar. 2020, all of which are incorporated herein by reference.

TECHNICAL FIELD

The present disclosure relates to a terminal cover.

BACKGROUND

The terminal cover of the present disclosure is mainly used for protecting the terminal connections of devices that are installed in vehicles, such as batteries, alternators and starters, for example. Generally, such a terminal cover is not mounted after the terminal has been bolted to an in-vehicle device in the vehicle assembly process, but is manufactured with the terminal cover ready-mounted to an electrical wire to which the terminal has been crimped in advance in the wire harness manufacturer, and the terminal cover is supplied to the vehicle assembly line in this state. In the process for connecting the terminal to an in-vehicle device, part of the terminal cover is then opened to expose the connection portion of the terminal, and the terminal is fastened with a nut and bolt, after which the terminal cover is closed to protect the terminal. In order to perform the above connection process more smoothly, it is desirable that the wire with terminal to which the terminal cover is mounted is provisionally latched in a state where the terminal cover exposes the connection portion of the terminal, and transported to the vehicle assembly line in this state.

Heretofore, a known example of such a terminal cover is described in Japanese Patent Laid-open Publication No. H08-096863 (hereinafter, Patent Document 1). This terminal cover includes a cover part, and is constituted by a cap body that accommodates an electrical wire and is attached on a terminal post side, and a protective opening-closing body joined to the cover part via a hinge. The cover part is provided with a provisional latching boss, and the protective opening-closing body is provided with a latching hole for engaging with the provisional latching boss. The protective opening-closing body is provisionally latched to the cover part in an open state.

PRIOR ART DOCUMENT

Patent Document

Patent Document 1: JP H08-096863 A

SUMMARY OF THE INVENTION

Problems to be Solved

However, with the terminal cover described in Patent Document 1, the provisional latching boss is exposed externally when engaged with the latching hole in the open state. Accordingly, when transporting an electrical wire with terminal to which this terminal cover is mounted, for example, the provisional latching could be disengaged by an external force, and the open state could be released.

The present disclosure has been completed based on circumstances such as the above, and an object thereof is to provide a terminal cover that is not susceptible to an open state being released by an external force.

Means to Solve the Problem

A terminal cover of the present disclosure includes a terminal protector having an opening part that is open upward, a wire protection part provided rearward continuously with the terminal protector, and a lid joined to a front end of the wire protection part via a hinge and configured to open and close the opening part from above, wherein a latching wall including a latching boss is provided to extend upward on an upper surface of the wire protection part, in a closed state in which the opening part is blocked off, the lid includes a protruding part protruding upward of the upper surface of the wire protection part and a surrounding part provided continuously downward from the protruding part and widening outward from the protruding part, the protruding part is provided with a latching part, the lid is maintained in an open state in which the opening part is open, due to the latching wall abutting the protruding part and the latching boss and the latching part latching together, and in the open state, the latching part is covered by the latching wall so as to not be exposed externally, and the latching boss is covered by the surrounding part so as to not be exposed externally.

Effect of the Invention

According to the present disclosure, a terminal cover that is not susceptible to an open state being released by an external force can be provided.

DETAILED DESCRIPTION TO EXECUTE THE INVENTION

Description of Embodiments of Disclosure

Initially, modes of the present disclosure will be enumerated and described.

(1) A terminal cover of the present disclosure includes a terminal protector having an opening part that is open upward, a wire protection part provided rearward continuously with the terminal protector, and a lid joined to a front end of the wire protection part via a hinge and configured to open and close the opening part from above, wherein a latching wall including a latching boss is provided to extend upward on an upper surface of the wire protection part, in a closed state in which the opening part is blocked off, the lid includes a protruding part protruding upward of the upper surface of the wire protection part and a surrounding part provided continuously downward from the protruding part and widening outward from the protruding part, the protruding part is provided with a latching part, the lid is maintained in an open state in which the opening part is open, due to the latching wall abutting the protruding part and the latching boss and the latching part latching together, and in the open state, the latching part is covered by the latching wall so as to not be exposed externally, and the latching boss is covered by the surrounding part so as to not be exposed externally.

According to such a configuration, the latching part and the latching boss are not exposed externally in the open state, and thus the open state is not susceptible to being released by an external force.

(2) Preferably, the latching wall is provided as a pair so as to oppose each other in a left-right direction.

According to such a configuration, the open state is not susceptible to being released by an external force, due to the protruding part fitting between the pair of latching walls, and the latching part and the latching boss latching together.

(3) Preferably, a first tapered surface inclining so as to proceed forward while proceeding upward is provided near the hinge of the wire protection part, in the open state, a second tapered surface inclining so as to proceed forward while proceeding upward is provided at a front end of the protruding part, and the first tapered surface and the second tapered surface are configured to engage each other, by sliding the lid forward in the open state.

According to such a configuration, by sliding the lid forward in the open state, the first tapered surface and the second tapered surface engage each other, and a force that moves the lid upward with respect to the wire protection part is generated, thus allowing the open state to easily be released manually.

(4) Preferably, a third tapered surface is provided at a rear end of the latching boss, and the third tapered surface inclines so as to approach the latching wall while proceeding rearward.

According to such a configuration, by sliding the lid forward in the open state, the latching boss rides up the lateral surface of the protruding part, and latching of the latching part and the latching boss is easily disengaged, thus allowing the open state to easily be released manually.

(5) Preferably, in the open state, a fourth tapered surface is provided rearward and downward of the latching part of the protruding part, such that the protruding part becomes thicker while proceeding downward, and the latching boss and the fourth tapered surface are configured to engage each other, by sliding the lid forward in the open state.

According to such a configuration, by sliding the lid forward in the open state, the latching boss rides up the lateral surface of the protruding part, and latching of the latching part and the latching boss is easily disengaged, thus allowing the open state to easily be released manually.

Detailed Description of Embodiments of Disclosure

Hereinafter, embodiments of the present disclosure will be described. The present disclosure is not limited to these illustrative examples and is defined by the claims, and all changes that come within the meaning and range of equivalency of the claims are intended to be embraced therein.

Embodiments

Embodiments of the present disclosure will be described with reference to FIGS. 1 to 9.

Terminal Cover

Figure 1:
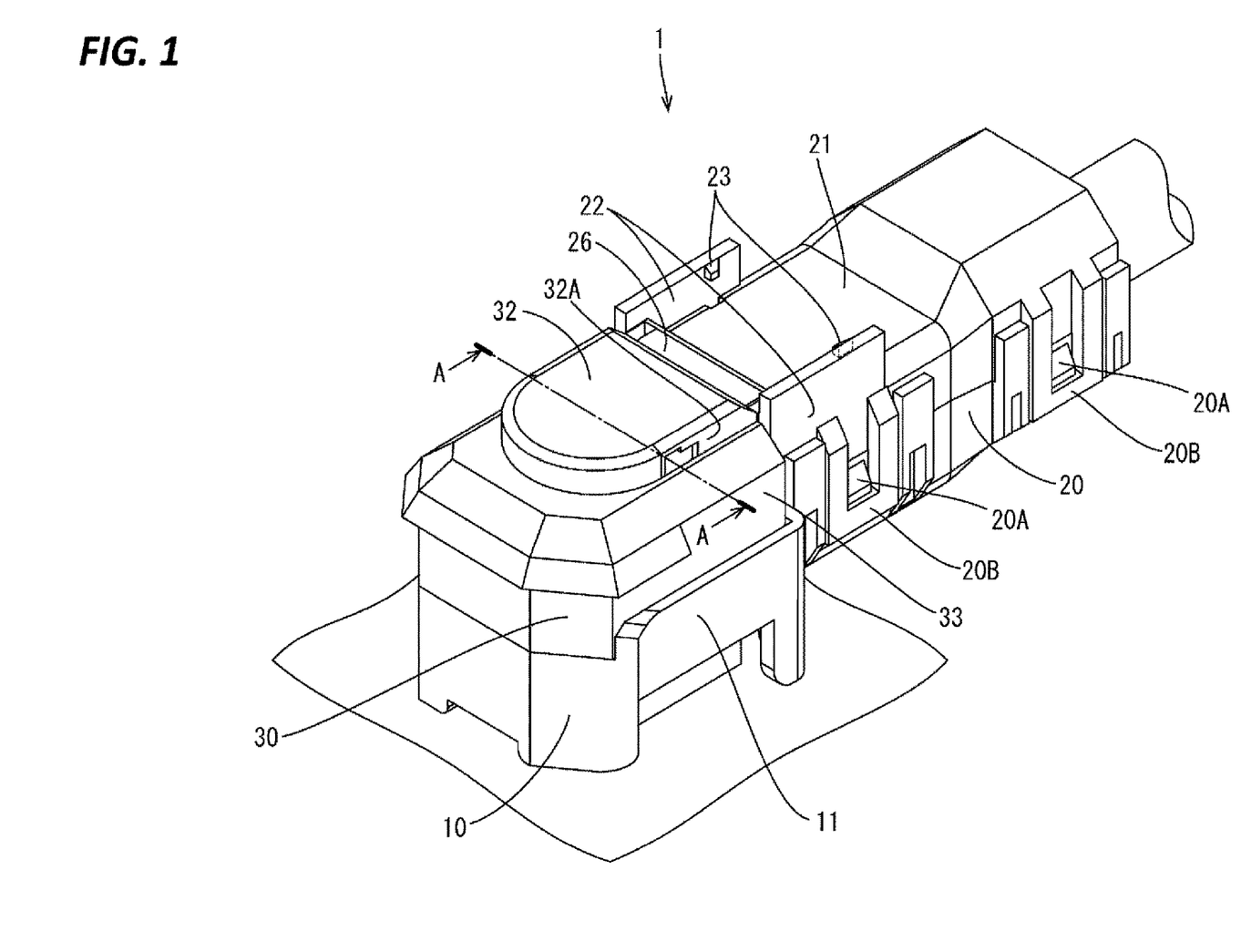
FIG. 1 is a perspective view of a terminal cover in a closed state according to an embodiment.
Figure 2:
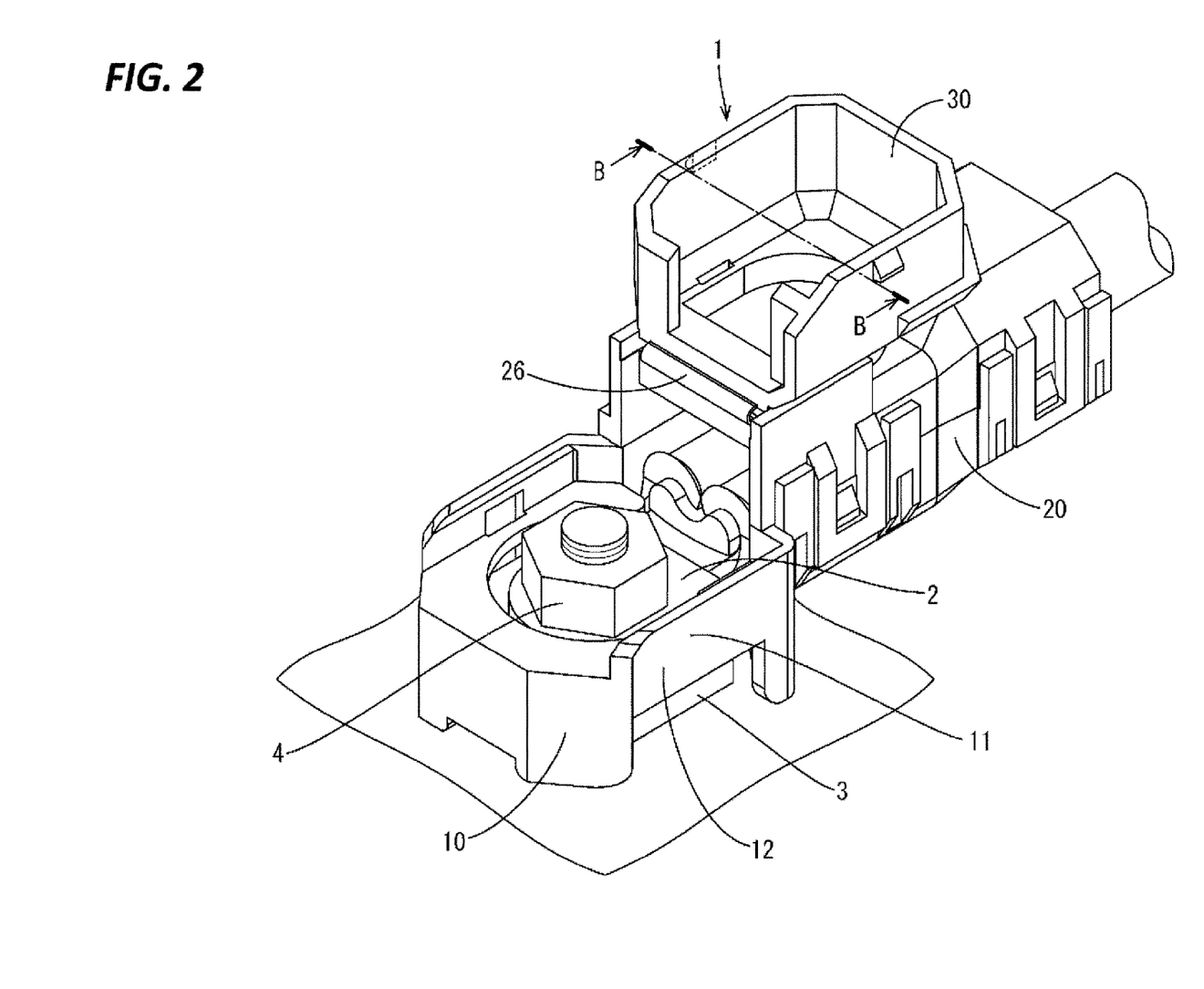
FIG. 2 is a perspective view of the terminal cover in an open state according to the embodiment.

A terminal cover 1 of the present embodiment is made of an insulating synthetic resin. As shown in FIG. 2, the terminal cover 1 is used as a protective member of a fastening portion that is for fastening a terminal 2 to a terminal post 3 using a fastening member 4 such as a nut. As shown in FIGS. 1 and 2, the terminal cover 1 includes a terminal protector 10 having an opening part 11, a wire protection part 20 provided continuously with the terminal protector 10, and a lid 30 configured to open and close the opening part 11. In the following description, the wire protection part 20 is arranged rearward of the terminal protector 10 with the front-rear direction being the longitudinal direction of the terminal cover 1, and the opening part 11 of the terminal protector 10 is open upward.

Terminal Protection Body, Opening Part

Figure 3:
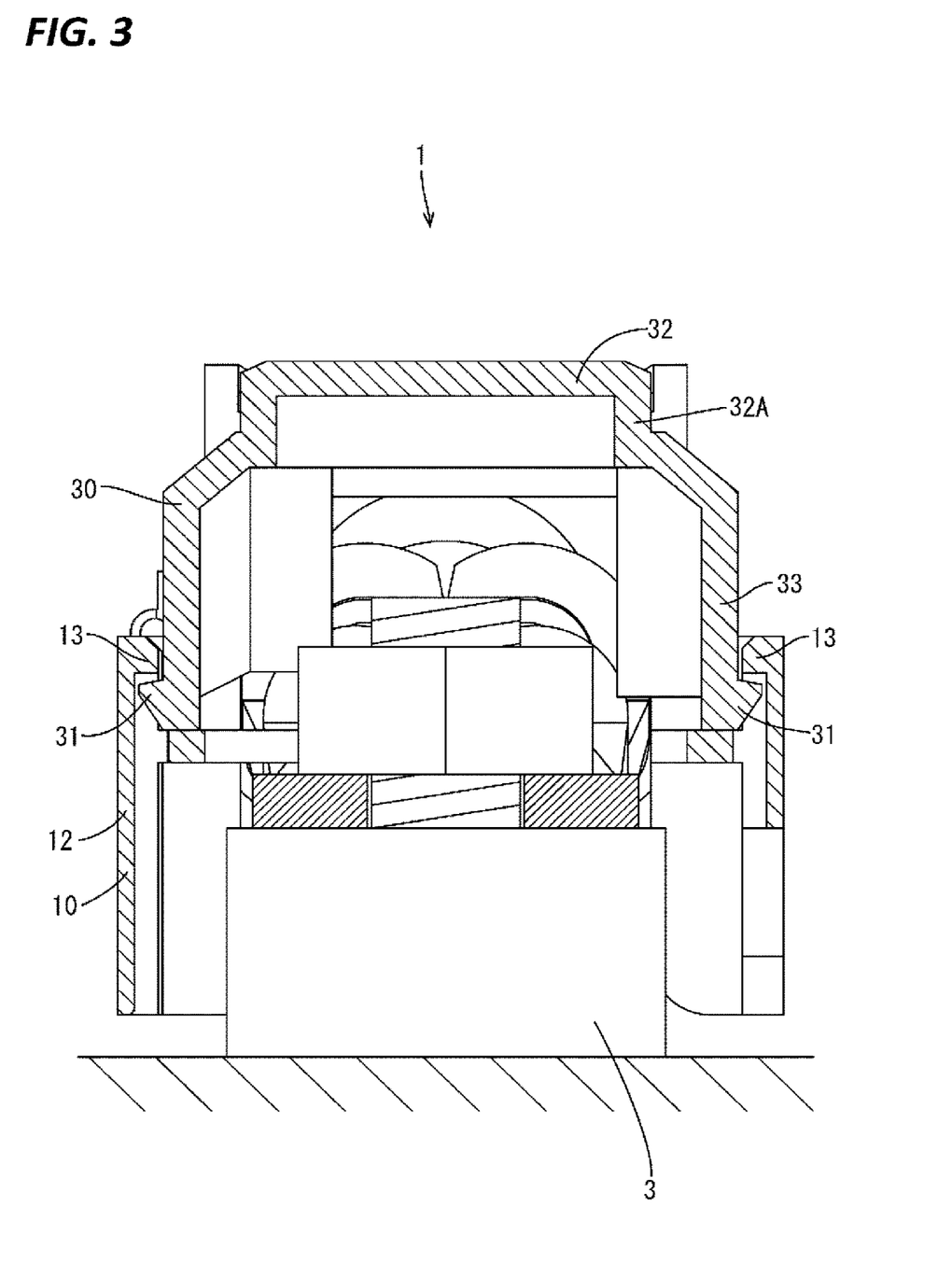
FIG. 3 is a cross-sectional view taken along A-A in FIG. 1.

As shown in FIG. 2, the terminal protector 10 has a peripheral wall 12 that is tubular in shape and open in the up-down direction. An upper opening of the peripheral wall 12 of the terminal protector 10 is constituted by the opening part 11. As shown in FIG. 1, the opening part 11 is blocked off by the lid 30 which is dome shaped. The state in which the opening part 11 is blocked off by the lid 30 in this way is a closed state. As shown in FIG. 3, in the closed state, a pair of latching pieces 13 provided on the peripheral wall 12 of the terminal protector 10 and a pair of latching protrusions 31 provided on the lid 30 are latched together. The lower opening of the peripheral wall 12 of the terminal protector 10 is configured to receive the terminal post 3.

Wire Protection Part, Latching Walls, Latching Bosses, Third Tapered Surfaces

Figure 4:
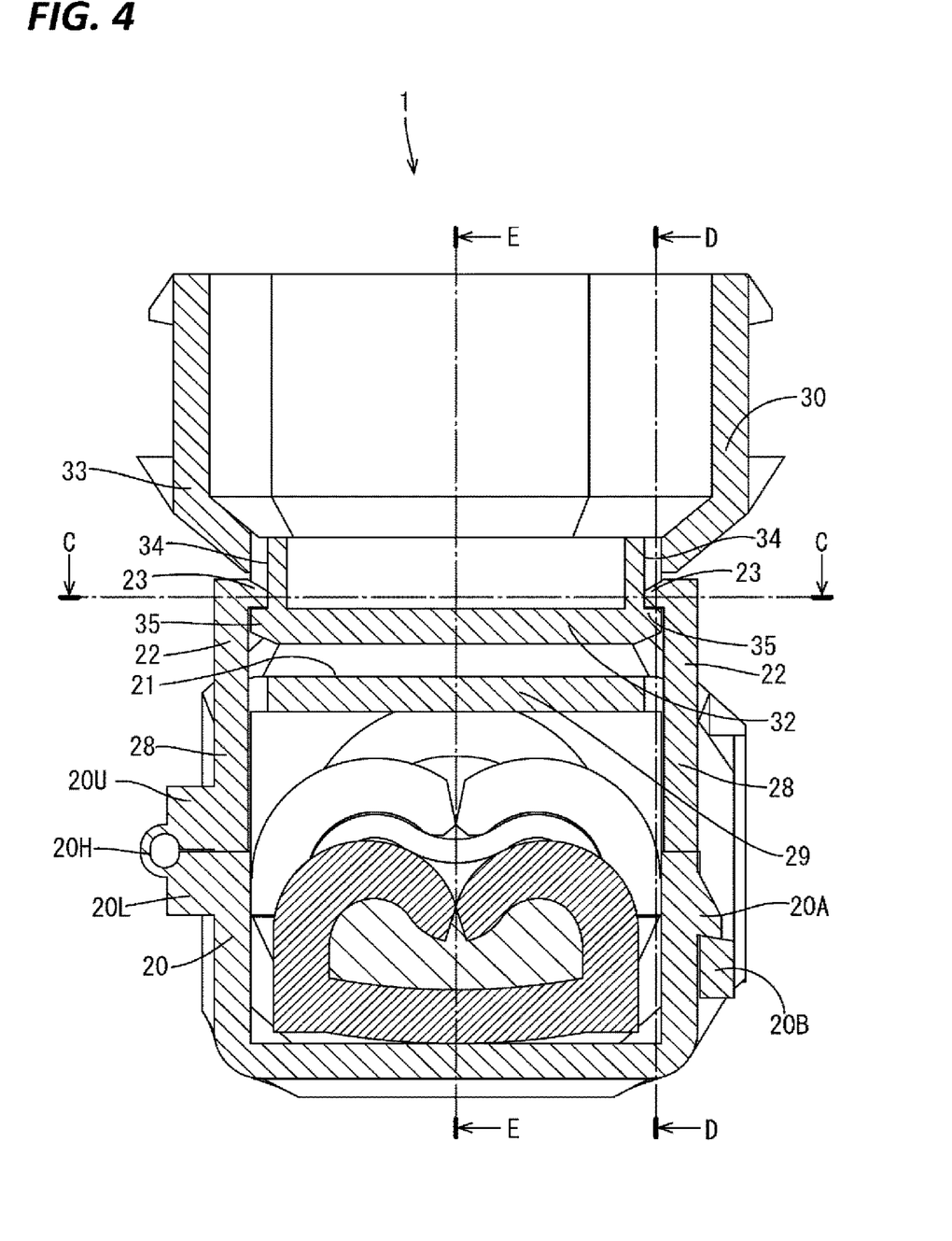
FIG. 4 is a cross-sectional view taken along B-B in FIG. 2.
Figure 6:
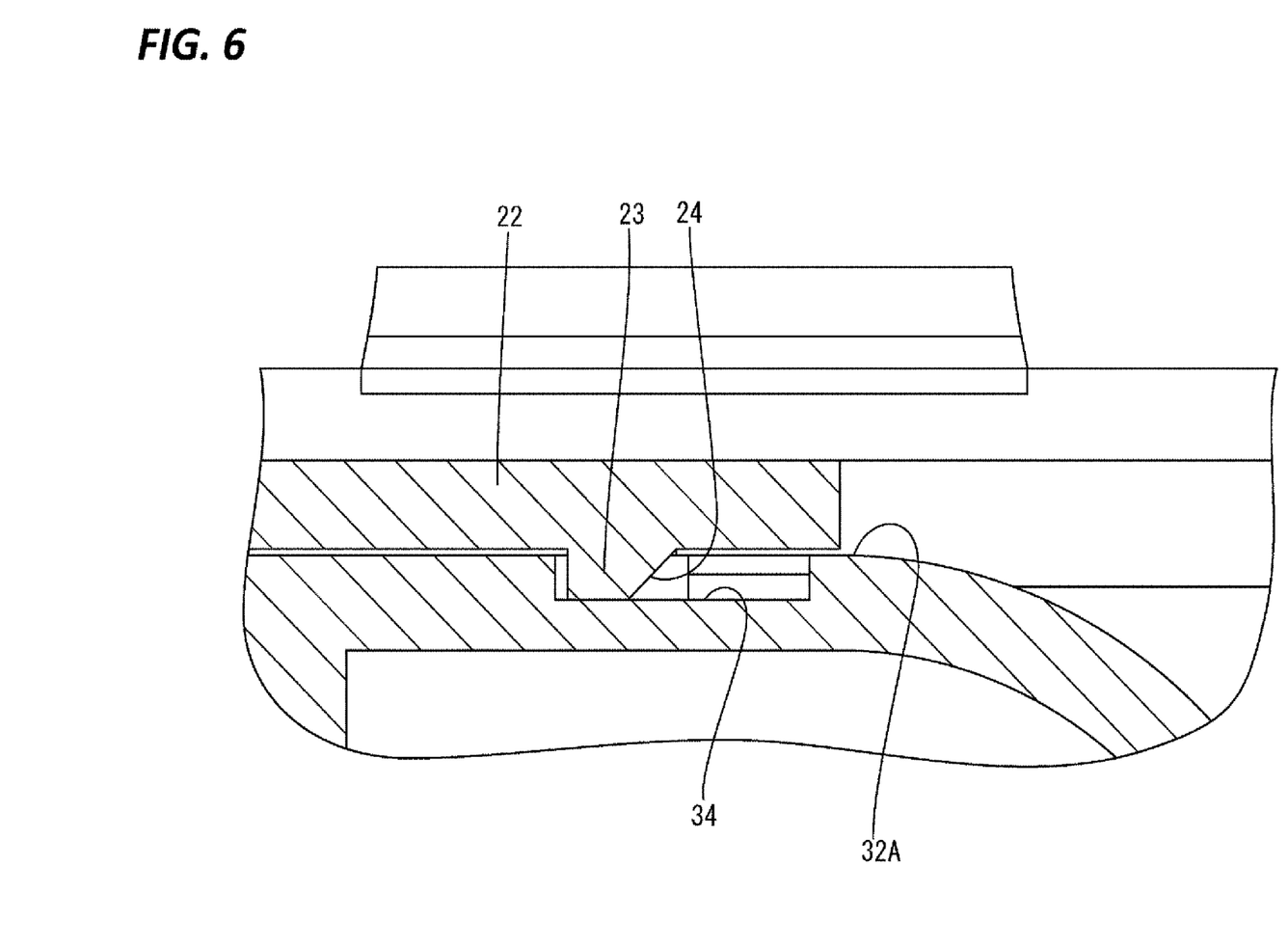
FIG. 6 is an enlarged view showing a surrounding region of a latching boss of FIG. 5.

The wire protection part 20 is tubular in shape and is open in the front-rear direction. The wire protection part 20 is formed by rotating an upper wire protection part 20U with respect to a lower wire protection part 20L with a hinge 20H shown in FIG. 4 as a support axis, and latching together lock protrusions 20A and lock arms 20B shown in FIGS. 1 and 4. As shown in FIG. 4, the wire protection part 20 includes a left and right pair of lateral walls 28 and a ceiling wall 29 that joins the upper ends of the lateral walls 28 to each other. As shown in FIG. 1, a pair of latching walls 22 are provided to extend upward at the front half portion of an upper surface 21 of the wire protection part 20. The pair of latching walls 22 are located at the left and right edges of the ceiling wall 29 of the wire protection part 20. As shown in FIG. 4, the latching walls 22 are arranged opposite and parallel to each other due to the pair of lateral walls 28 protruding upward of the upper surface 21 of the ceiling wall 29. A pair of latching bosses 23 are provided on inner surfaces of the pair of the latching walls 22, as shown in FIGS. 1 and 4. The latching bosses 23 are formed to protrude in the left-right direction (direction in which the pair of latching walls 22 oppose each other). As shown in FIG. 6, a third tapered surface 24 is provided at the rear end of the latching boss 23. The third tapered surface 24 inclines so as to approach the latching wall 22 while proceeding rearward.

Hinge, First Tapered Surface

Figure 9:
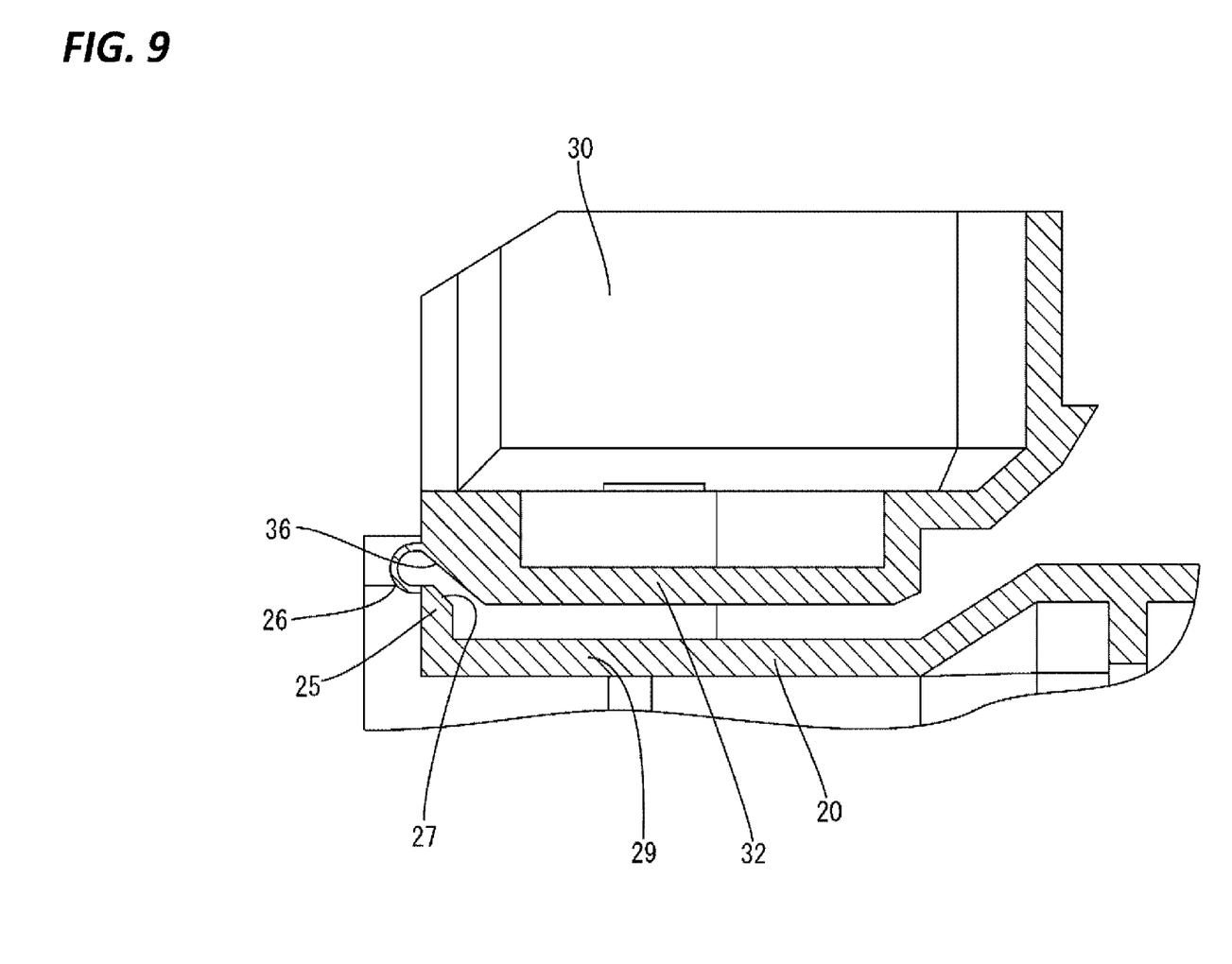
FIG. 9 is an enlarged view showing a surrounding region of a lid in a cross section taken along E-E in FIG. 4.

As shown in FIG. 9, a release auxiliary wall 25 is provided to protrude upward at the front end of the ceiling wall 29 of the wire protection part 20. The lid 30 is joined to the release auxiliary wall 25 via a flexible hinge 26. A first tapered surface 27 is provided on the upper side of the release auxiliary wall 25. The first tapered surface 27 inclines so as to proceed forward while proceeding upward.

Lid, Protruding Part, Surrounding Part, Second Tapered Surface

As shown in FIG. 1, the lid 30 is rotatable with the hinge 26 as a support axis, and is configured to be maintained in the closed state (FIG. 1) and in an open state (FIG. 2) in which the opening part 11 is open. The lid 30 includes a protruding part 32 that protrudes upward of the upper surface 21 of the wire protection part 20 in the closed state and a surrounding part 33 provided continuously downward from the protruding part 32. The protruding part 32 constitutes an upper portion of the lid 30 and has a peripheral wall 32A. As shown in FIG. 3, the surrounding part 33 is formed to widen more outwardly than the peripheral wall 32A. As shown in FIG. 9, in the open state, a second tapered surface 36 is provided at the front end of the protruding part 32. The second tapered surface 36 inclines so as to proceed forward while proceeding upward.

Latching Parts, Fourth Tapered Surfaces

Figure 5:
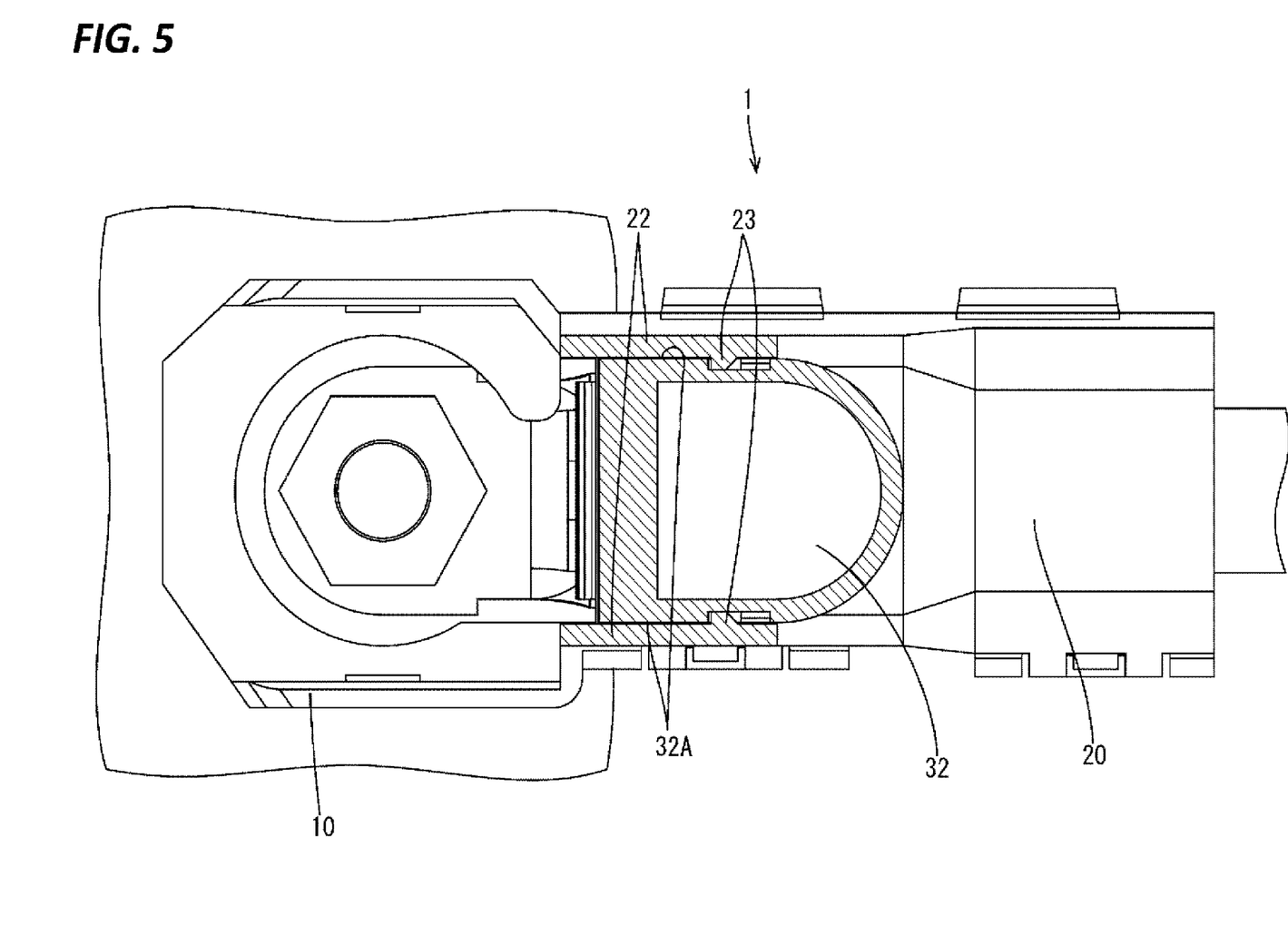
FIG. 5 is a cross-sectional view taken along C-C in FIG. 4.
Figure 7:
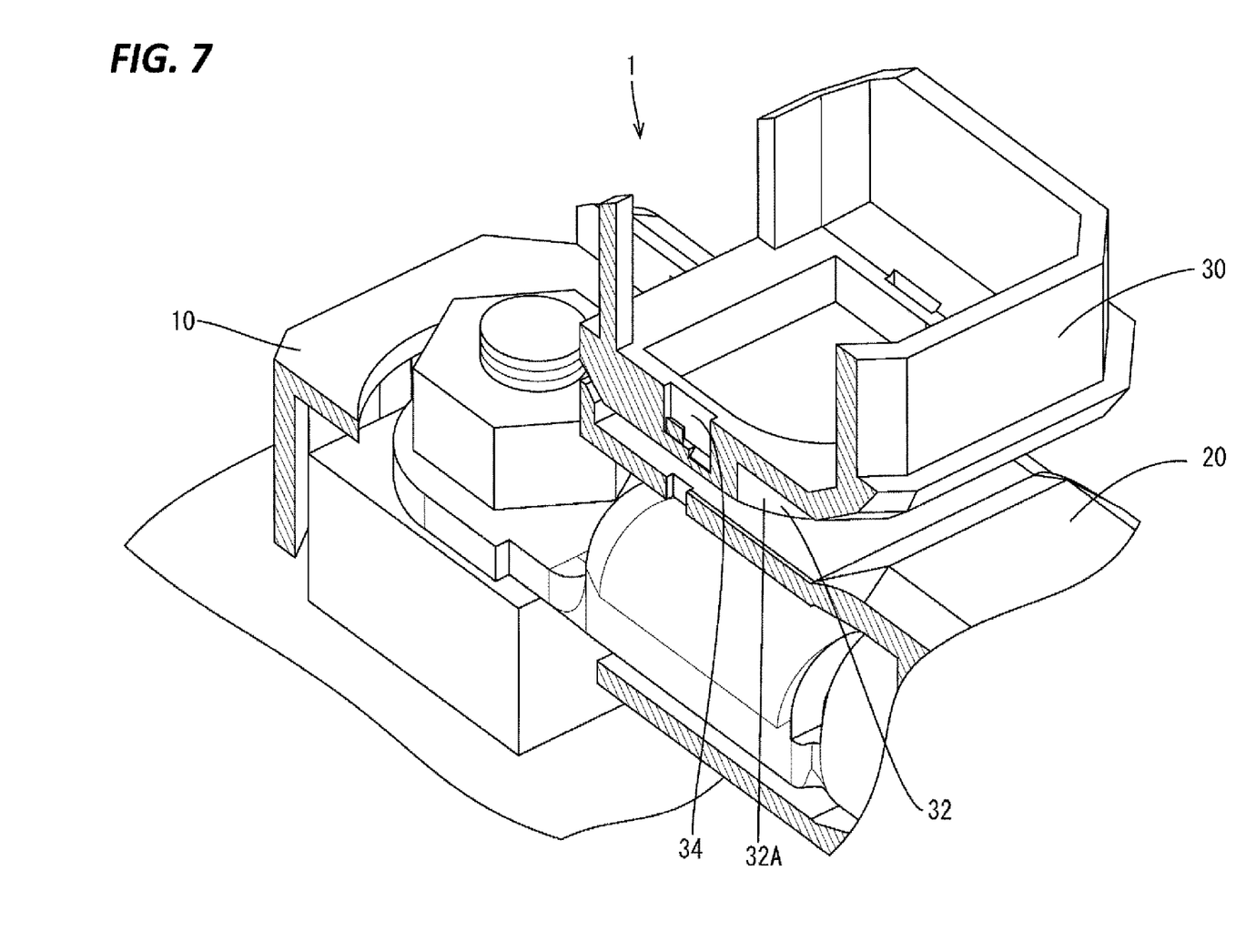
FIG. 7 is an enlarged perspective view showing a cross-section taken along D-D in FIG. 4.
Figure 8:
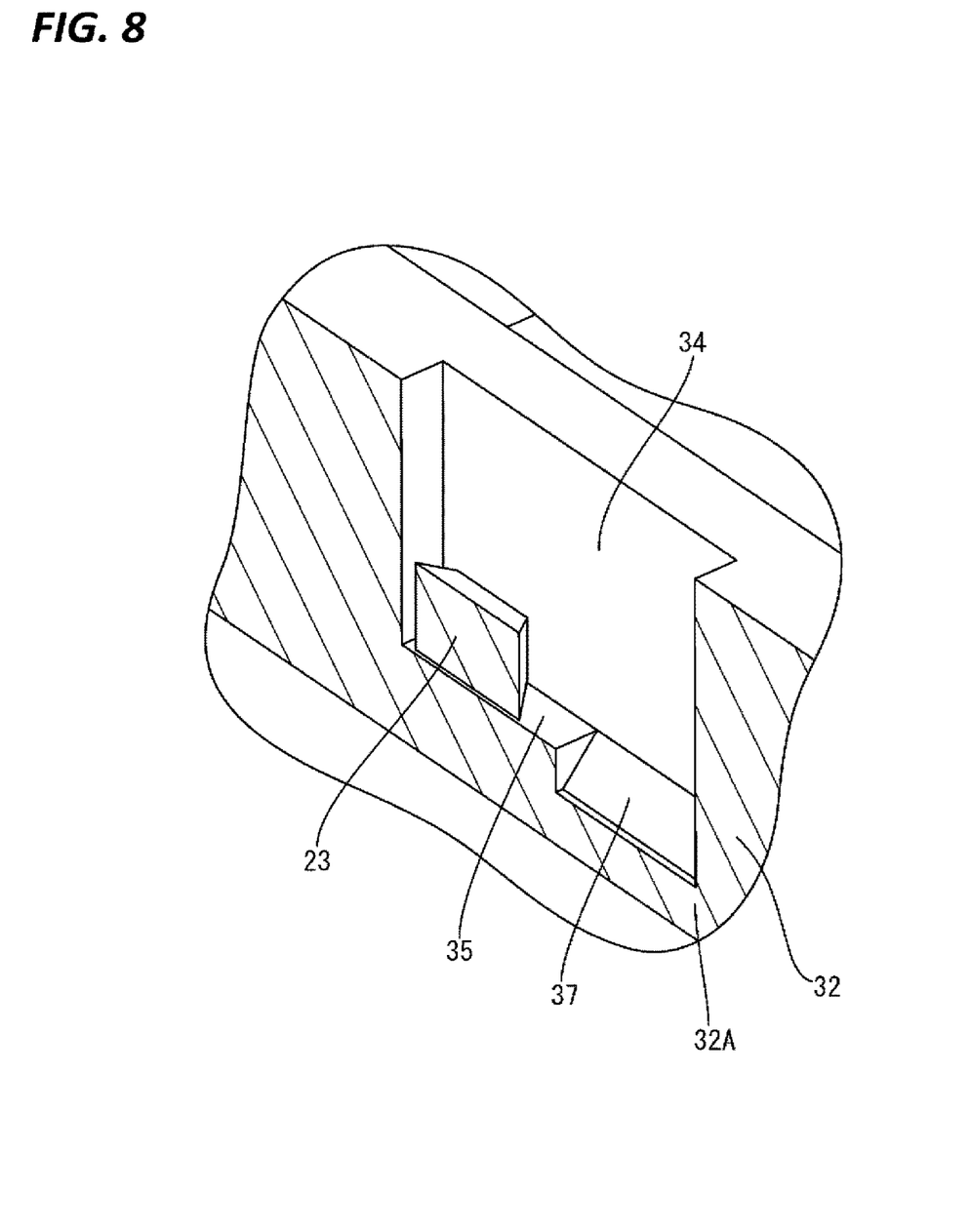
FIG. 8 is an enlarged view showing a surrounding region of a thin part in FIG. 7.

As shown in FIG. 7, the protruding part 32 is provided with a thin part 34 where the peripheral wall 32A is formed thinly. As shown in FIG. 4, in the open state, the thin part 34 is arranged as a pair so as to oppose the pair of latching walls 22. As shown in FIG. 8, in the open state, a latching part 35 is provided at the front half portion of the thin part 34. As shown in FIG. 5, in the open state, the protruding part 32 fits between the pair of latching walls 22, and the peripheral wall 32A abuts the pair of latching walls 22 in the left-right direction. Also, as shown in FIGS. 4 and 8, the latching parts 35 latch onto the latching bosses 23 from below. As shown in FIG. 8, in the open state, a fourth tapered surface 37 is provided at the rear half portion of the thin part 34. The fourth tapered surface 37 is recessed more inwardly than the latching part 35. The fourth tapered surface 37 is inclined such that the peripheral wall 32A of the protruding part 32 becomes thicker while proceeding downward. The upper edge of the fourth tapered surface 37 joins the thin part 34 at the same height as the latching part 35.

In the above configuration, in the open state, the latching parts 35 are covered by the latching walls 22 so as to not be exposed externally, as shown in FIG. 4. Also, the latching bosses 23 are covered by the surrounding part 33 so as to not be exposed externally. That is, the latching parts 35 and the latching bosses 23 are not exposed externally in the open state. The latching parts 35 and the latching bosses 23 are thereby not susceptible to direct application of an external force. Accordingly, during transportation, for example, latching of the latching parts 35 and the latching bosses 23 is not easily disengaged by an external force, and the open state is stably maintained.

Also, with the above configuration, by sliding the lid 30 forward in the open state, the open state is easily released manually, as described below. Note that the length of the hinge 26 in the front-rear direction in the closed state is set to allow enough room for the lid 30 to slide forward.

When the lid 30 moves forward in the open state, the latching boss 23 easily rides up the peripheral wall 32A, due to the third tapered surface 24 engaging the rear end of the thin part 34, in FIG. 6, and the open state is easily released.

When the lid 30 is slid forward in the open state, the lid 30 also moves upward while being pushed forward, due to the first tapered surface 27 and the second tapered surface 36 engaging each other, in FIG. 9. The lid 30 thus easily disengages from the wire protection part 20, and the open state is easily released.

Furthermore, when the lid 30 moves forward and upward in the open state, the latching boss 23 engages the fourth tapered surface 37 and easily rides up the peripheral wall 32A, in FIG. 8. This also facilitates release of the open state.

Operation and Effect of Embodiment

According to the present embodiment, the following operation and effect are achieved.

A terminal cover 1 according to the present embodiment includes a terminal protector 10 having an opening part 11 that is open upward, a wire protection part 20 provided rearward continuously with the terminal protector 10, and a lid 30 joined to a front end of the wire protection part 20 via a hinge 26 and configured to open and close the opening part 11 from above. A latching wall 22 including a latching boss 23 is provided to extend upward on an upper surface 21 of the wire protection part 20. In a closed state in which the opening part 11 is blocked off, the lid 30 includes a protruding part 32 protruding upward of the upper surface 21 of the wire protection part 20, and a surrounding part 33 provided continuously downward from the protruding part 32 and widening outward from the protruding part 32. Also, the protruding part 32 is provided with a latching part 35. The lid 30 is maintained in an open state in which the opening part 11 is open, due to the latching wall 22 abutting the protruding part 32 and the latching boss 23 and the latching part 35 latching together, and, in the open state, the latching part 35 is covered by the latching wall 22 so as to not be exposed externally, and the latching boss 23 is covered by the surrounding part 33 so as to not be exposed externally.

According to the above configuration, the latching part 35 and the latching boss 23 are not exposed externally in the open state, and thus, during transportation, for example, the open state is not susceptible to being released by an external force.

In the present embodiment, the latching wall 22 is provided as a pair so as to oppose each other in the left-right direction.

According to the above configuration, the open state is not susceptible to being released by an external force, due to the protruding part 32 fitting between the pair of latching walls 22, and the latching part 35 and the latching boss 23 latching together.

In the present embodiment, a first tapered surface 27 that inclines so as to proceed forward while proceeding upward is provided near the hinge 26 of the wire protection part 20, in the open state, a second tapered surface 36 that inclines so as to proceed forward while proceeding upward is provided at a front end of the protruding part 32, and the first tapered surface 27 and the second tapered surface 36 are configured to engage each other, by sliding the lid 30 forward in the open state.

According to the above configuration, by sliding the lid 30 forward in the open state, the first tapered surface 27 and the second tapered surface 36 engage each other, and a force that moves the lid 30 upward with respect to the wire protection part 20 is generated, thus allowing the open state to easily be released manually.

In the present embodiment, a third tapered surface 24 is provided at the rear end of the latching boss 23, and the third tapered surface 24 is inclined so as to approach the latching wall 22 while proceeding rearward.

According to the above configuration, by sliding the lid 30 forward in the open state, the latching boss 23 rides up the lateral surface of the protruding part 32, and latching of the latching part 35 and the latching boss 23 is easily disengaged, thus allowing the open state to easily be released manually.

In the present embodiment, in the open state, a fourth tapered surface 37 is provided rearward and downward of the latching part 35 of the protruding part 32 such that the protruding part 32 becomes thicker while proceeding downward, and the latching boss 23 and the fourth tapered surface 37 are configured to engage each other, by sliding the lid 30 forward in the open state.

According to the above configuration, by sliding the lid 30 forward in the open state, the latching boss 23 rides up the lateral surface of the protruding part 32, and latching of the latching part 35 and the latching boss 23 is easily disengaged, thus allowing the open state to easily be released manually.

OTHER EMBODIMENTS (1) In the embodiment, a configuration is adopted in which the left and right pair of latching walls 22 are provided on the upper surface 21 of the wire protection part 20, but the invention is not limited thereto, and the position and number of latching walls can be changed, and the following configurations may be adopted, for example.

(1a) Configuration in which one latching wall is provided at the rear of the upper surface of the wire protection part, and the latching wall abuts the protruding part from the rear in the open state.

(1b) Configuration in which three latching walls are provided on the left and right and at the rear of the upper surface of the wire protection part.

(1c) Configuration in which one latching wall configured to abut the protruding part by way of surrounding the protruding part to the rear thereof from the left and right in the open state is provided, and this latching wall has a plurality of latching bosses.

(2) In the embodiment, a configuration is adopted in which a plurality of tapered surfaces that improve the releasability of the open state are provided, but the invention is not limited thereto, and some or all of these tapered surfaces need not be provided.

LIST OF REFERENCE NUMERALS

1 Terminal cover
2 Terminal
3 Terminal post
4 Fastening member
10 Terminal protector
11 Opening part
12, 32A Peripheral wall
13 Latching piece
20 Wire protection part
20A Lock protrusion
20B Lock arm
20H, 26 Hinge
20L Lower wire protection part
20U Upper wire protection part
21 Upper surface
22 Latching wall
23 Latching boss
24 Third tapered surface
25 Release auxiliary wall
27 First tapered surface
28 Lateral wall
29 Ceiling wall
30 Lid
31 Latching protrusion
32 Protruding part
33 Surrounding part
34 Thin part
35 Latching part
36 Second tapered surface
37 Fourth tapered surface

What is claimed is:

1. A terminal cover comprising:
a terminal protector having an opening part that is open upward;
a wire protection part provided rearward continuously with the terminal protector; and
a lid joined to a front end of the wire protection part via a hinge, and configured to open and close the opening part from above,
wherein a latching wall including a latching boss is provided to extend upward on an upper surface of the wire protection part,
in a closed state in which the opening part is blocked off, the lid includes a protruding part protruding upward of the upper surface of the wire protection part, and a surrounding part provided continuously downward from the protruding part and widening outward from the protruding part,
the protruding part is provided with a latching part,
the lid is maintained in an open state in which the opening part is open, due to the latching wall abutting the protruding part, and the latching boss and the latching part latching together, and
in the open state, the latching part is covered by the latching wall so as to not be exposed externally, and the latching boss is covered by the surrounding part so as to not be exposed externally.

2. The terminal cover according to claim 1,
wherein the latching wall is provided as a pair so as to oppose each other in a left-right direction.

3. The terminal cover according to claim 2,
wherein a first tapered surface inclining so as to proceed forward while proceeding upward is provided near the hinge of the wire protection part,
in the open state, a second tapered surface inclining so as to proceed forward while proceeding upward is provided at a front end of the protruding part, and
the first tapered surface and the second tapered surface are configured to engage each other, by sliding the lid forward in the open state.

4. The terminal cover according to claim 3,
wherein a third tapered surface is provided at a rear end of the latching boss, and
the third tapered surface inclines so as to approach the latching wall while proceeding rearward.

5. The terminal cover according to claim 3,
wherein, in the open state, a fourth tapered surface is provided rearward and downward of the latching part of the protruding part, such that the protruding part becomes thicker while proceeding downward, and
the latching boss and the fourth tapered surface are configured to engage each other, by sliding the lid forward in the open state.

* * * * *